US011774947B2

(12) United States Patent
Shao et al.

(10) Patent No.: US 11,774,947 B2
(45) Date of Patent: Oct. 3, 2023

(54) INDUSTRIAL INTERNET OF THINGS FOR MATERIAL TRANSPORTATION CONTROL, CONTROL METHODS AND MEDIA THEREOF

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Haitang Xiang, Chengdu (CN); Yong Li, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/173,046

(22) Filed: Feb. 22, 2023

(65) Prior Publication Data
US 2023/0195082 A1  Jun. 22, 2023

(30) Foreign Application Priority Data

Aug. 16, 2022 (CN) .......................... 202210979834.6

(51) Int. Cl.
*G05B 19/4155* (2006.01)
(52) U.S. Cl.
CPC ............ *G05B 19/4155* (2013.01); *G05B 2219/40068* (2013.01)
(58) Field of Classification Search
CPC .................................................. G05B 19/4155
(Continued)

(56) References Cited

U.S. PATENT DOCUMENTS

2015/0317759 A1    11/2015  Jing et al.
2017/0357270 A1*   12/2017  Russell ................. G06V 20/58
(Continued)

FOREIGN PATENT DOCUMENTS

CN        105354648 A      2/2016
CN        108628322 A     10/2018
(Continued)

OTHER PUBLICATIONS

Liu, Guodong et al., Two-stage Dynamic Path Planning for Multiple AGV Scheduling Systems, Robot, 27(3): 210-214, 2005.
(Continued)

*Primary Examiner* — Mohammad Ali
*Assistant Examiner* — Joshua T Sanders
(74) *Attorney, Agent, or Firm* — METIS IP LLC

(57) ABSTRACT

The present disclosure discloses an Industrial Internet of Things for material transportation control, a control method and a medium thereof, wherein the management platform in the Industrial Internet of Things includes: an obtaining module configured to generate a first layout directed graph; a material module configured to assign a material requirement to a corresponding material end point and assign a material supply to a corresponding material start point; a decomposition module configured to divide each material end point into a plurality of sub-nodes; a reconstruction module configured to form a third layout directed graph; a first calculation module configured to calculate a first path; a correction module configured to form an intermediate layout directed graph; and a second calculation module configured to calculate a second path.

10 Claims, 5 Drawing Sheets

(58) Field of Classification Search
USPC .......................................................... 700/112
See application file for complete search history.

(56) References Cited

U.S. PATENT DOCUMENTS

| | | | | |
|---|---|---|---|---|
| 2018/0308039 A1* | 10/2018 | Nemati | ................... | G06N 5/022 |
| 2021/0034795 A1* | 2/2021 | Zhang | ..................... | G06F 30/13 |
| 2021/0103286 A1* | 4/2021 | Wang | ................... | G05D 1/0221 |

FOREIGN PATENT DOCUMENTS

| | | | | | |
|---|---|---|---|---|---|
| CN | 110334837 | A | | 10/2019 | |
| CN | 110560373 | A | | 12/2019 | |
| CN | 111091238 | A | * | 5/2020 | ............. G06N 3/126 |
| CN | 111860991 | A | | 10/2020 | |
| CN | 111984981 | A | | 11/2020 | |
| CN | 114201303 | A | | 3/2022 | |
| CN | 114281048 | A | | 4/2022 | |
| CN | 114298218 | A | | 4/2022 | |

OTHER PUBLICATIONS

Decision to Grant a Patent in Chinese Application No. 202210979834.6 dated Sep. 30, 2022, 10 pages.

* cited by examiner

INDUSTRIAL INTERNET OF THINGS FOR MATERIAL TRANSPORTATION CONTROL, CONTROL METHODS AND MEDIA THEREOF

CROSS-REFERENCE TO RELATED DISCLOSURES

This application claims the priority of the Chinese application No. 202210979834.6 filed on Aug. 16, 2022, the entire content of which is incorporated herein by reference.

TECHNICAL FIELD

The present disclosure relates to intelligent manufacturing technology, in particular to an Industrial Internet of Things for material transportation control, a control method and a medium thereof.

BACKGROUND

An Automated Guided Vehicle (AGV) refers to a transport vehicle equipped with an automatic navigation device such as an electromagnetic or optical automatic navigation device, which may travel along a prescribed navigation path, and has safety protection and various transfer functions. In industrial applications, the transport vehicle with no driver may use a rechargeable battery as its power source. Generally, a travel path and a behavior of the transport vehicle may be controlled by a computer, or set by an electromagnetic track. The electromagnetic track is pasted on the floor, and the transport vehicle with no driver relies on information brought by the electromagnetic track to move and act.

With the development of intelligent manufacturing technology, the AGV has begun to be applied on a large scale as an important device for feeding and unloading. Especially, the AGV with a circular path is very suitable for a large-scale production line that requires a frequent feeding. At present, an ant colony algorithm is often used for a point-to-point path planning for the AGV with the circular path, but for the large-scale production line, the travel frequency of the AGV may be increased, and congestion may be prone to occur at the intersection of circular paths.

SUMMARY

In order to at least overcome the above deficiencies in the prior art, the purpose of the present disclosure is to provide an Industrial Internet of Things for material transportation control, a control method and a medium thereof.

In a first aspect, the embodiments of the present disclosure provide an Industrial Internet of Things for material transportation control, including a sensor network platform, a management platform, and a service platform connected in sequence, wherein the management platform includes:
  an obtaining module, configured to obtain an AGV circuit layout of a target workshop through the sensor network platform, and generate a first layout directed graph according to the AGV circuit layout, wherein nodes of the first layout directed graph include AGV circuit intersections, a material start point, and a material end point, an edge of the first layout directed graph is an AGV circuit, and a weight of the edge of the first layout directed graph is a length of the edge;
  a material module, configured to obtain a material requirement of a target process, assign the material requirement to a corresponding material end point, and assign a material supply corresponding to the material requirement to a corresponding material start point;
  a decomposition module, configured to divide each material end point into a plurality of sub-nodes according to a material requirement category of the material end point, and each sub-node corresponding to a category of material;
  a reconstruction module, configured to reconstruct the first layout directed graph according to all the sub-nodes to form a second layout directed graph, and extract sub-nodes corresponding to a same material to form a third layout directed graph;
  a first calculation module, configured to calculate a first path in the third layout directed graph, wherein the first path is a shortest path passing through all the sub-nodes corresponding to the same material;
  a correction module, configured to select an intermediate node from the first path, and delete the intermediate node from the second layout directed graph to form an intermediate layout directed graph, wherein the intermediate node is the sub-node that is not a start point of the first path;
  a second calculation module, configured to calculate a second path in the intermediate layout directed graph, wherein the second path is an optimal path from the material start point to a corresponding sub-node of the start point of the first path;
  a merging module, configured to merge the first path and the second path into a final AGV path; and
  a communication module, configured to send the final AGV path to a user platform through the service platform to display to a user.

In the prior art, in using an AGV with a circular path, a path planning is often performed point-to-point. If a production line layout is relatively simple and a count of same production line layouts is small, this method may be very efficient. However, if the steps of the production line are complex and the count of production line layouts with a same category is large, the AGV may be dispatched frequently to load materials, which is likely to cause queue congestion in many places.

When the embodiments of the present disclosure are implemented, the embodiments are implemented based on a five-platform structure proposed by inventors. The user platform is a terminal that displays information to a user and receives user instructions, and the object platform is an AGV circuit and an AGV terminal.

In the embodiment of the present disclosure, the service platform may adopt a post-fraction arrangement. The service platform may include a general service platform and at least two service sub-platforms, and different service sub-platforms are used to receive different categories of data transmitted by the general service platform. The sensor network platform may adopt a post-split arrangement. The sensor network platform may include a general sensor network platform and at least two sensor network sub-platforms, and different sensor network sub-platforms are used to receive different categories of data transmitted to the management platform. The management platform may adopt a centralized arrangement, that is, received data is processed and sent uniformly.

When the embodiments of the present disclosure are implemented, the AGV circuit layout of the target workshop may be obtained first and a first layout directed graph may be generated. For the AGV with a circular path, the path is unidirectional, so the direction in the first layout directed graph may be set according to the direction of the AGV circuit. Similarly, the management platform may select the AGV circuit intersections, the material start point, and the material end point as nodes in the directed graph and select the AGV circuit as the edge. The weight of the edge may be the length of the edge, and the directed graph may be a standard directed graph for path finding. In order to ensure the accuracy of the path calculation, it is necessary to assign the value of the material to the material end point and the material start point, for example, assign the steel plate to the material start point A, assign the panel to the material start point B, assign the steel plate and the panel to the material end point A, and assign the panel to the material end point B.

Because on the production line, a material start point often corresponds to only one material, and a material end point often receives a plurality of materials, so in the embodiment of the present disclosure, the material end point is decomposed, and the decomposed sub-node corresponds to only one material. Reconstructing the decomposed sub-nodes in the first layout directed graph may form a second layout directed graph, which is used to reflect a direct transportation relationship of different materials. The third layout directed graph is used to reflect a transportation relationship between the corresponding sub-nodes of the same material.

In order to reduce the travel frequency of AGV vehicles, the embodiment of the present disclosure uses a shortest path through all sub-nodes corresponding to the same material found in the third layout directed graph as a material distribution path for once AGV vehicle trip, that is, the feeding requirements of all the sub-nodes corresponding to the same material may be satisfied through the once AGV vehicle trip. The purpose of selecting intermediate nodes from the first path and deleting them from the second layout directed graph is to calculate a second path that satisfies the first path, so as to satisfy the needs of the AGV vehicle to distribute materials along the first path. By calculating the second path in the intermediate layout directed graph, the optimal path for the AGV to transport materials to the first path may be obtained. At this time, after the first path and the second path are combined, a combined path for the one-time full feeding of a single material can be formed, and the AGV vehicle can complete all the feeding of the single material at one time along the path, which effectively saves the travel frequency of the AGV vehicle. In the embodiment of the present disclosure, through a two-stage planning of the travel path of the AGV vehicle, the travel frequency of the AGV vehicle is effectively reduced, the transportation pressure on the AGV path is reduced, and it is also very beneficial to the travel planning of the AGV vehicle and the feeding planning of the production line in a later stage, reducing the control and calculation pressure of the unmanned intelligent factory area.

In the second aspect, the embodiments of the present disclosure provide an Industrial Internet of Things control method for material transportation control, which is applied to a sensor network platform, a management platform, and a service platform that are connected in sequence, and the control method is executed by the management platform.

The control method includes:
  obtaining the AGV circuit layout of a target workshop through the sensor network platform, and generating a first layout directed graph according to the AGV circuit layout, wherein the nodes of the first layout directed graph include AGV circuit intersections, the material start point, and the material end point, the edge of the first layout directed graph is an AGV circuit; the weight of the edge of the first layout directed graph being the length of the edge;
  obtaining the material requirements of the target process, assigning the material requirements to the corresponding material end points, and assigning the material supply corresponding to the material requirements to the corresponding material start points;
  dividing each material end point into a plurality of sub-nodes according to the material requirement category of the material end point, and each sub-node corresponding to one category material;
  reconstructing the first layout directed graph according to all the sub-nodes to form a second layout directed graph, and extracting the sub-nodes corresponding to the same material to form a third layout directed graph;
  calculating a first path in the third layout directed graph, where the first path is the shortest path passing through all the sub-nodes corresponding to the same material;
  selecting an intermediate node from the first path, and deleting the intermediate node from the second layout directed graph to form an intermediate layout directed graph, where the intermediate node is a sub-node that is not a start point of the first path;
  calculating a second path in the intermediate layout directed graph, where the second path is an optimal path from the material start point to a corresponding sub-node of the start point of the first path;
  merging the first path and the second path into a final AGV path; and
  sending the final path of the AGV to the user platform through the service platform to be displayed to the user.

One of the embodiments of the present disclosure provides a computer-readable storage medium, the storage medium stores computer instructions, and when the computer instructions are executed by a processor, implements the Industrial Internet of Things control method for material transportation control as described in any one of the foregoing embodiments.

Compared with the prior art, the present disclosure has the following advantages and beneficial effects.

The industrial Internet of Things, control method and medium for material transportation control in the present disclosure effectively reduces the travel frequency of AGV vehicles and the transportation pressure on the AGV circuit by performing the two-stage planning on the travel paths of AGV vehicles, which is also very beneficial to the travel planning of AGV vehicles and the feeding planning of the production line in the later period, and reduces the control and calculation pressure of unmanned intelligent factory areas.

BRIEF DESCRIPTION OF THE DRAWINGS

The accompanying drawings described herein are used to provide a further understanding of the embodiments of the present disclosure, constitute a part of the present disclosure, and do not constitute a limitation to the embodiments of the present disclosure. In the accompanying drawings.

DETAILED DESCRIPTION

Figure 1:
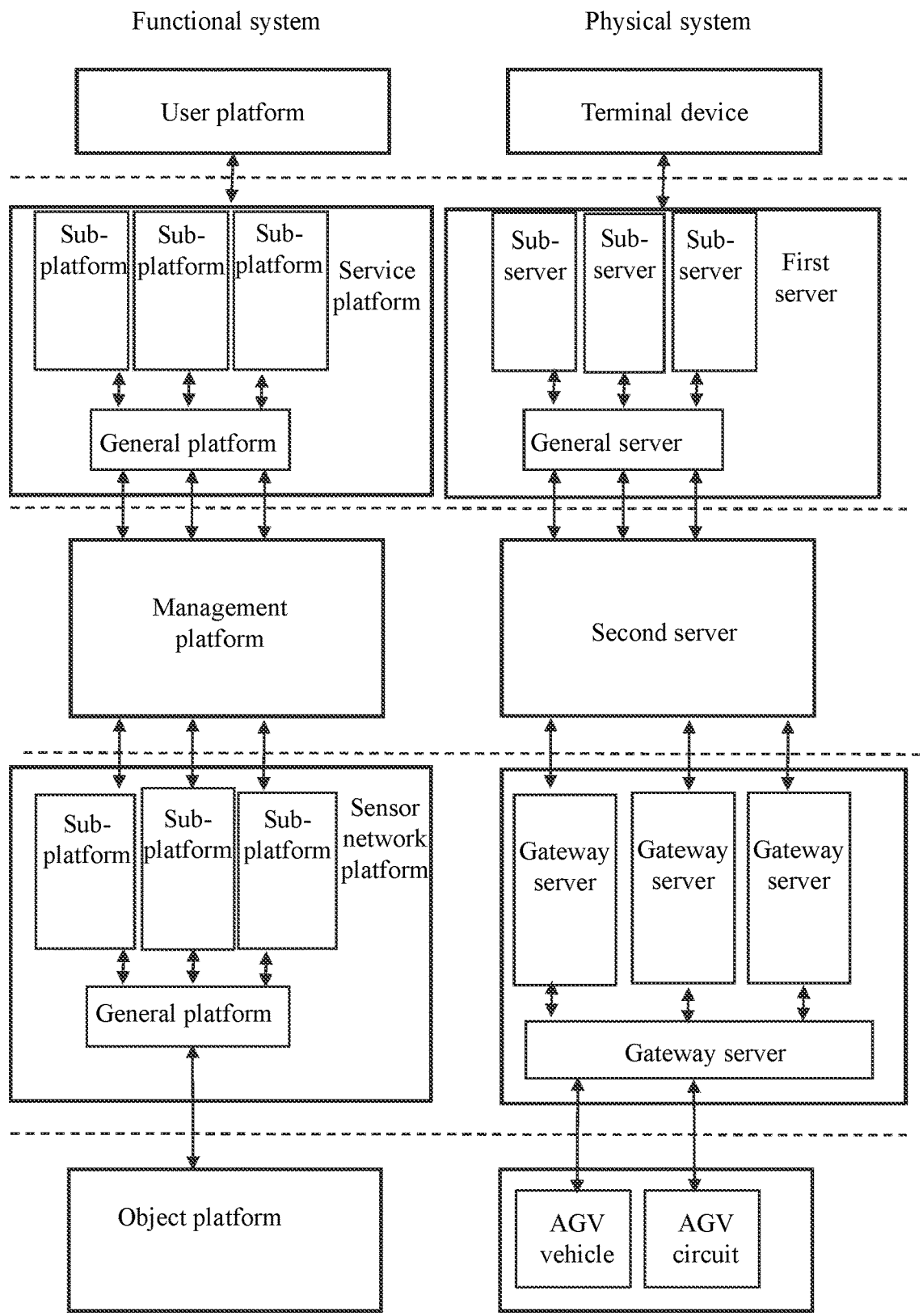
FIG. 1 is a schematic diagram of a system structure according to some embodiments of the present disclosure.

In order to make the purposes, technical solutions and advantages of the embodiments of the present disclosure clearer, the technical solutions in the embodiments of the present disclosure will be clearly and completely described below with reference to the accompanying drawings in the embodiments of the present disclosure. The drawings are only for the purpose of illustration and description, and are not used to limit the protection scope of the present disclosure. In addition, it should be understood that the schematic accompanying drawings are not drawn to scale. The flowcharts used in the present disclosure illustrate operations implemented in accordance with some of the embodiments of the present disclosure. It should be understood that the operations of the flowcharts may be performed out of order and that steps without logical context may be performed in reverse order or concurrently. In addition, those skilled in the art can add one or more other operations to the flowchart, and can also delete one or more operations from the flowchart under the guidance of the contents of the present disclosure.

In addition, the described embodiments are only some of the embodiments of the present disclosure, but not all of the embodiments. The components of the embodiments of the present disclosure generally described and illustrated in the drawings herein may be arranged and designed in a variety of different configurations. Thus, the following detailed description of the embodiments of the present disclosure provided in the accompanying drawings is not intended to limit the scope of the present disclosure as claimed, but is merely representative of selected embodiments of the present disclosure. Based on the embodiments of the present disclosure, all other embodiments obtained by those skilled in the art without creative efforts shall fall within the protection scope of the present disclosure. As shown in the present disclosure, unless the context clearly indicates exceptional circumstances, words such as "a", "an", "one" and/or "the" are not specifically singular, but may also include plural. Generally speaking, the terms "including" and "comprising" only imply the inclusion of clearly identified steps and elements, but these steps and elements do not constitute an exclusive list, and methods or devices may also contain other steps or elements.

In order to facilitate the description of the above-mentioned Industrial Internet of Things for material transportation control, please refer to FIG. 1, which provides a schematic diagram of the communication architecture of the Industrial Internet of Things for material transportation control disclosed in the embodiments of the present disclosure.

The Industrial Internet of Things for material transportation control may include an object platform, a sensor network platform, a management platform, a service platform and a user platform connected in sequence, wherein the management platform includes:

an obtaining module, configured to obtain an AGV circuit layout of a target workshop through the sensor network platform, and generate a first layout directed graph according to the AGV circuit layout, wherein nodes of the first layout directed graph include AGV circuit intersections, a material start point, and a material end point, an edge of the first layout directed graph is the AGV circuit, and a weight of the edge of the first layout directed graph is a length of the edge;

a material module, configured to obtain a material requirement of a target process, assign the material requirement to a corresponding material end point, and assign a material supply corresponding to the material requirement to a corresponding material start point;

a decomposition module, configured to divide each material end point into a plurality of sub-nodes according to a material requirement category of the material end point, and each sub-node corresponding to a category of material;

a reconstruction module, configured to reconstruct the first layout directed graph according to all the sub-nodes to form a second layout directed graph, and extract sub-nodes corresponding to a same material to form a third layout directed graph;

a first calculation module, configured to calculate a first path in the third layout directed graph, wherein the first path is a shortest path passing through all the sub-nodes corresponding to the same material;

a correction module, configured to select an intermediate node from the first path, and delete the intermediate node from the second layout directed graph to form an intermediate layout directed graph, wherein the intermediate node is the sub-node that is not a start point of the first path;

a second calculation module, configured to calculate a second path in the intermediate layout directed graph, wherein the second path is an optimal path from the material start point to a corresponding sub-node of the start point of the first path;

a merging module, configured to merge the first path and the second path into a final AGV path; and a communication module, configured to send the final AGV path to a user platform through the service platform to display to a user.

In the prior art, in using an AGV with a circular path, a path planning is often performed point-to-point. If a production line layout is relatively simple and a count of same production line layouts is small, this method may be very efficient. However, if steps of the production line are complex and the count of production line layouts with a same category is large, the AGV may be dispatched frequently to load materials, which is likely to cause queue congestion in many places.

When the embodiments of the present disclosure are implemented, they are implemented based on the five-platform structure proposed by the inventor. The user platform is the terminal that displays information to the user and receives user instructions, and the object platform is the AGV circuit and the AGV terminal.

In the embodiment of the present disclosure, the service platform may adopt a post-fraction arrangement; wherein the service platform may include a general service platform and at least two service sub-platforms, and different service sub-platforms are used to receive different categories of data transmitted by the general service platform; the sensor network platform may adopt the post-split arrangement; the sensor network platform may include a general sensor network platform and at least two sensor network sub-platforms, and different sensor network sub-platforms are used to receive different categories of data transmitted to the management platform. The management platform may adopt a centralized arrangement, that is, the received data is processed and sent uniformly.

The target workshop may refer to a workshop that needs to perform a material transportation. For example, the target workshop may be an assembly workshop, a production workshop, a packaging workshop, and so on. The assembly workshop may be an automobile assembly workshop, or the like.

The AGV circuit layout may refer to an overall layout of the transportation circuit of an Automated Guided Vehicle (hereinafter referred to as an AGV vehicle). The AGV vehicle may refer to a transport vehicle equipped with an automatic guidance device such as an electromagnetic or optical automatic guidance device, which may travel along a prescribed guidance path, and has safety protection and various transfer functions.

The first layout directed graph may refer to a graph reflecting a direction of material transportation in the target workshop. For example, the first layout directed graph may be a graph generated according to a certain workshop AGV circuit layout.

In some embodiments, the first layout directed graph may include node data as well as edge data.

The node data of the first layout directed graph may include nodes and corresponding node attributes. The node attributes may refer to information used to describe the nodes. The nodes of the first layout directed graph may include a material start point, a material end point, and intersections of the AGV circuit.

The material start point may refer to a location in the target workshop where the material is stored. For example, the location in the automobile assembly workshop where materials such as engine cases, dashboards, and gearboxes of different types are stored. In some embodiments, the attribute of the material start point may include a material category. The material category refers to a material category that may be supplied by the material start point. For example, the material categories in the automobile assembly workshop include an engine category, a dashboard category, a gearbox category, etc.

The material end point may refer to a location in the target workshop where the material needs to be transported to. In some embodiments, the attribute of the material end point may include a material requirement. The material requirement refers to information related to the requirement of a certain material of the material end point, such as a required count and required time of the certain material.

The AGV circuit intersection may refer to a connection point where each AGV circuit crosses in the target workshop.

In some embodiments, the obtaining module may acquire node data through an interface. The interface includes but are not limited to program an interface, a data interface, a transmission interface, or the like.

In some embodiments, the obtaining module may obtain the node data through the sensor network platform. For example, the obtaining module may automatically obtain relevant information of the material start point and the material end point through the sensor network platform.

In some embodiments, the obtaining module may also obtain node data in any manner known to those skilled in the art.

The edge data of the first layout directed graph may include edges and corresponding edge attributes. In some embodiments, the edges of the first layout directed graph may correspond to an AGV circuit between any two nodes. In some embodiments, the edge attributes may be lengths of the edges. For example, there may be a plurality of AGV circuit intersections between the material start point and the material end point, and there may also be a plurality of edges between the material start point and the material end point, and different edges have different lengths.

In some embodiments, the obtaining module may obtain the edge data through the interface. The obtaining module may obtain the edge data through the sensor network platform. In some embodiments, the obtaining module may also obtain the edge data in any manner known to those skilled in the art.

In some embodiments, the AGV circuit layout of the target workshop may be obtained in a plurality of ways. For example, the obtaining module may obtain the AGV circuit layout of the target workshop through the sensor network platform. As another example, the obtaining module may obtain the AGV circuit layout of the target workshop from a storage device inside or outside the system.

In some embodiments, the obtaining module may construct a first layout directed graph based on obtained node data and edge data. For example, based on the sensor network platform, the obtaining module may construct the first layout directed graph by obtaining the material start point information, material end point information, and information of the AGV circuit laid in the target workshop, etc.

In some embodiments, the obtaining module may also generate the first layout directed graph in any manner well known to those skilled in the art. For example, the obtaining module may also generate the first layout directed graph by manual input, or the like.

When the embodiments of the present disclosure are implemented, the AGV circuit layout of the target workshop may be obtained first and the first layout directed graph may be generated. For an AGV with a circular path, the path is unidirectional, so the direction in the first layout directed graph may be set according to the direction of the AGV circuit. In some embodiments, the direction of the AGV circuit in the first layout directed graph may be unidirectional and/or bidirectional. The direction of the AGV circuit may be set according to actual needs. Similarly, the nodes in the directed graph select the AGV circuit intersection, the material start point and the material end point, and the edges select the AGV circuit, the weight of the edge is the length of the edge, and this directed graph is a standard directed graph for path finding.

The target process may refer to a processing process from raw material input to finished product output that requires material transportation in the target workshop. For example, the target process of an automobile assembly workshop may include processes such as stamping, welding, assembly, painting, etc.

The material supply may refer to information related to the supply of materials. For example, the material supply may refer to the supply count and the supply time of a certain material from a certain material start point in the target workshop.

In some embodiments, the material requirements of the target process may be obtained in a plurality of ways. For example, the material module may obtain the material requirements of the target process from the storage device inside or outside the system. As another example, the material module may obtain the material requirements of the target process through manual input.

In order to ensure the accuracy of the path calculation, it is necessary to assign the value of the material to the material end point and the material start point. For example, assign the steel plate to the material start point A, assign the panel to the material start point B, assign the steel plate and the panel to the material end point C, and assign the panel to the material end point D.

The material requirement category may refer to a category to which the material in the material requirement belongs. For example, the material requirement category may be an engine category, a dashboard category, a gearbox category, and so on.

A sub-node may refer to a subordinate node of a node. For example, a sub-node may be a subordinate node of a certain material end point.

Because on the production circuit, a material start point often corresponds to only one material, and a material end point often receives a plurality of materials, so in the embodiment of the present disclosure, the material end point is decomposed, and the decomposed sub-nodes correspond to only one material.

In some embodiments, the decomposition module may divide each material end point into a plurality of sub-nodes according to the material requirement category of the material end point, and each sub-node corresponds to a material.

The second layout directed graph may refer to a graph reflecting the transportation relationship between different materials. For example, the second layout directed graph may be a graph including all sub-nodes generated based on the first layout directed graph.

In some embodiments, the second layout directed graph may include node data as well as edge data.

The node data of the second layout directed graph may include nodes and corresponding node attributes. The nodes of the second layout directed graph may include the material start point, the material end point, and the AGV circuit intersection. In some embodiments, the attribute of the material start point may include material supply. For more information about the material start point, material supply and the AGV circuit intersection, see the above related descriptions.

The sub-nodes of the material end point may refer to subordinate nodes that divide the material end point into different requirements. For example, the sub-nodes of the material end point may be the sub-nodes $E_1$, $E_2$, and $E_3$ corresponding to the material end point E. In some embodiments, the attributes of the sub-nodes of the material end point may include the material requirement corresponding to each sub-node. More information on the material requirement may be found in the aforementioned related descriptions.

The edge data of the second layout directed graph may include edges and corresponding edge attributes. In some embodiments, the edges of the second layout directed graph may correspond to an AGV circuit between any two nodes. For example, if there is an AGV circuit between any two nodes in the material start point, the sub-nodes of the material end point, and the AGV circuit intersection, there is an edge between the any two nodes. In some embodiments, the edge attributes may be lengths of the edges.

In some embodiments, the manner for obtaining the node data and edge data of the second layout directed graph may refer to the foregoing manner for obtaining the node data and edge data in the first layout directed graph.

In some embodiments, the reconstruction module may reconstruct the first layout directed graph according to all the sub-nodes to form the second layout directed graph. For example, the reconstruction module may replace all the material end points in the first layout directed graph with the sub-nodes of corresponding material end points based on the first layout directed graph generated by the obtaining module and all the sub-nodes decomposed by the decomposition module. And each of the sub-nodes of the material end point inherits the corresponding attribute of the material end point. The reconstruction module may further assign the edge corresponding to the material end point to all the sub-nodes of the corresponding material end point to complete the reconstruction of the second layout directed graph.

The sub-nodes corresponding to the same material refer to sub-nodes corresponding to a same material category.

The third layout directed graph may refer to a graph reflecting the transportation relationship between the same materials. For example, the third layout directed graph may be a graph generated based on the second layout directed graph and may include all sub-nodes corresponding to the same material. In some embodiments, a plurality of third layout directed graphs may be formed based on the second layout directed graph. For example, a second layout directed graph may have a plurality of different materials, each of which may form a third-layout directed graph.

In some embodiments, the third layout directed graph may include node data as well as edge data.

The node data of the third layout directed graph may include nodes and corresponding node attributes. The nodes of the third layout directed graph may include sub-nodes of the material end point, the AGV circuit intersection, and the material start point, or the like. In some embodiments, the attributes of the material end sub-node may include the material requirements of the same material of the material end sub-node. For more information about the material end sub-node, material requirements, material start point and AGV circuit intersection, please refer to the foregoing related descriptions.

The edge data of the third layout directed graph may include edges and corresponding edge attributes. In some embodiments, the edges of the third layout directed graph may correspond to an AGV circuit between any two nodes. For example, if there is an AGV circuit between any two nodes in all material end sub-nodes, AGV circuit intersection, material start point, etc., there is an edge between any two nodes. In some embodiments, the edge attributes may be the lengths of the edges.

In some embodiments, the manner for obtaining node data and edge data of the third layout directed graph may refer to the foregoing manner for obtaining node data and edge data in the first layout directed graph.

In some embodiments, the reconstruction module may extract sub-nodes corresponding to the same material to form a third layout directed graph.

In some embodiments, the reconstruction module may extract the sub-nodes corresponding to the same material as candidate sub-nodes; in the second layout directed graph, only the candidate sub-nodes, AGV circuit intersections and material start point are reserved as nodes to form the third layout directed graph.

After reconstruction, the reconstruction module may form a second layout directed graph in which each of the sub-nodes of the material end point has a corresponding material requirement assignment, and the sub-nodes of the material end point with the material requirement assignment corresponding to the same material may be extracted to form the third layout directed graph.

Reconstructing the decomposed sub-nodes in the first layout directed graph may form a second layout directed graph, which is used to reflect the direct transportation relationship of different materials. The third layout directed graph is used to reflect the transportation relationship between the sub-nodes corresponding to the same material.

The first path may refer to a shortest path passing through all sub-nodes corresponding to the same material, for example, the shortest path between all the sub-nodes of the material end points of requiring a same kind of dashboards.

In order to reduce the travel frequency of the AGV vehicles, the embodiment of the present disclosure uses the third layout directed graph to find the shortest path through all sub-nodes corresponding to the same materials as the material distribution path for one AGV vehicle trip, that is, the feeding requirements of all the sub-nodes corresponding to the same material may be satisfied through the once AGV vehicle trip.

In some embodiments, the first calculation module may calculate the first path in the third layout directed graph. For example, the corresponding sub-nodes requiring the same kind of dashboards in the third layout directed graph are 1, 2, and 3, and the first calculation module may obtain all paths passing through the sub-nodes 1, 2, and 3 according to the third layout directed graph. The first calculation module may further calculate a distance of each path separately, and select the path with a shortest distance as the first path.

In some embodiments, the first calculation module may further process the third layout directed graph to determine a minimum graph. Based on the minimum graph, the count of singularities of the nodes or sub-nodes in the minimum graph may be determined. Based on the count of singularities, whether an AGV feeding vehicle passes through a same road section at least once in a journey through all the sub-nodes corresponding to the same material may be determined. In response to the AGV feeding vehicle not passing the same road section at least once, the first path may be determined based on a manner of not passing through the same road section. In response to the AGV feeding vehicle passing through the same road section at least once, after pairing each two of the singularities based on a pairing condition, the first path may be determined based on a manner of passing through the same road section.

Figure 3:
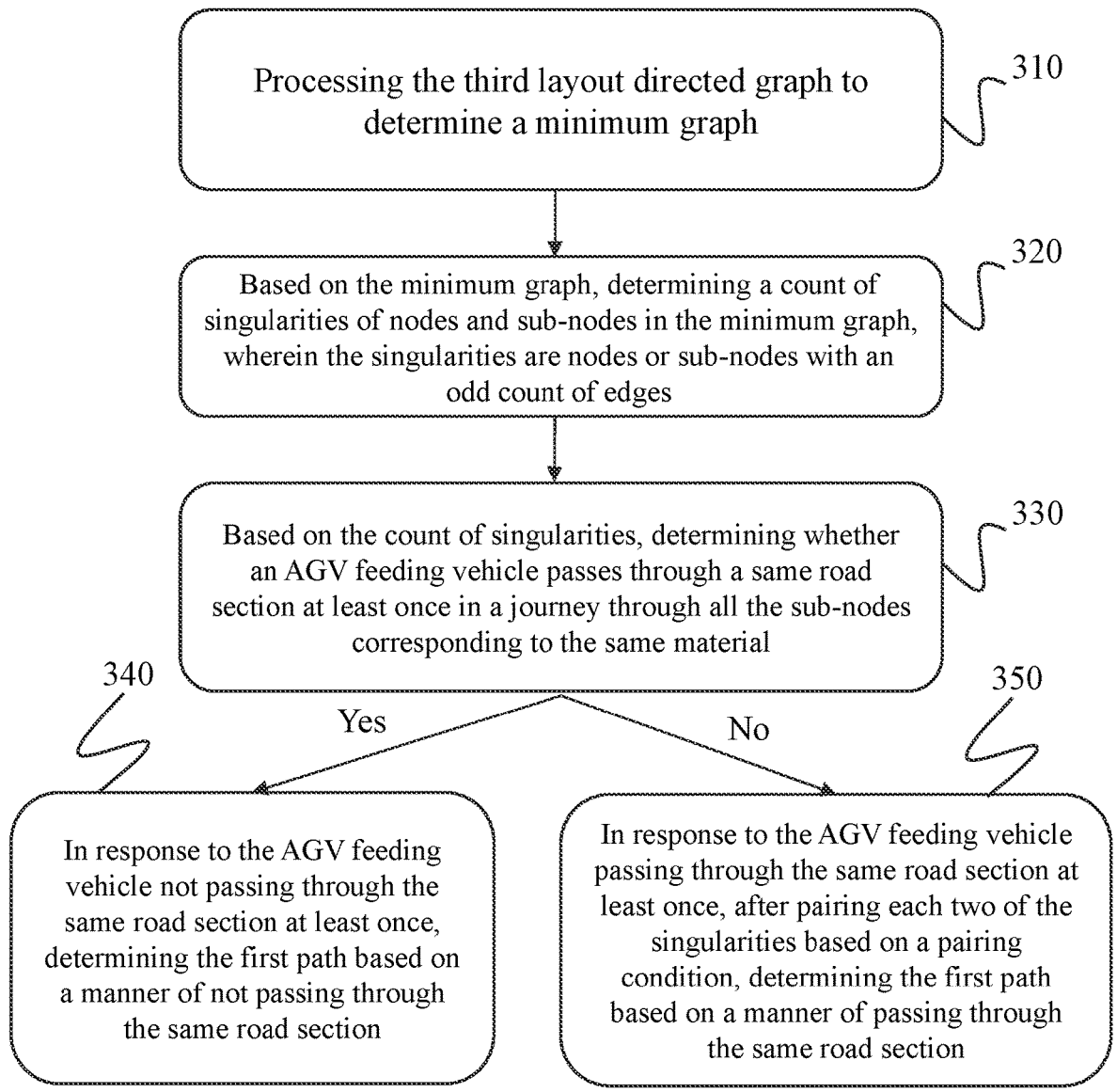
FIG. 3 is a flowchart illustrating an exemplary process for determining a first path according to some embodiments of the present disclosure.

For more content about determining the first path based on the minimum graph, please refer to FIG. 3 and related descriptions thereof.

An intermediate node may refer to a sub-node that is not the start point of the first path.

The intermediate layout directed graph may refer to a graph reflecting the transportation relationship between the material start point and the start point of the first path. For example, the intermediate layout directed graph may be a directed graph obtained by deleting the intermediate nodes from the second layout directed graph.

In some embodiments, the correction module may select an intermediate node from the first path, and delete the intermediate node from the second layout directed graph to form an intermediate layout directed graph.

The purpose of selecting intermediate nodes from the first path and deleting them from the second layout directed graph is to calculate a second path that satisfies the first path and satisfies the requirements of the AGV vehicle to distribute materials along the first path.

The second path may refer to the optimal path from the material start point to the start point (sub-node) of the corresponding first path.

In some embodiments, the second calculation module may calculate a second path in the intermediate layout directed graph. For example, the second calculation module may obtain all paths between the start point of a material and the start point of a corresponding first path in the intermediate layout directed graph, calculate the distances of each path separately, and select the path with the shortest distance as the second path.

In some embodiments, the second calculation module may also obtain the heats of the AGV circuit intersections. Based on the material start point, the heats of the AGV circuit intersections and intermediate layout directed graph, the second path may be determined based on a shortest path algorithm.

Figure 5:
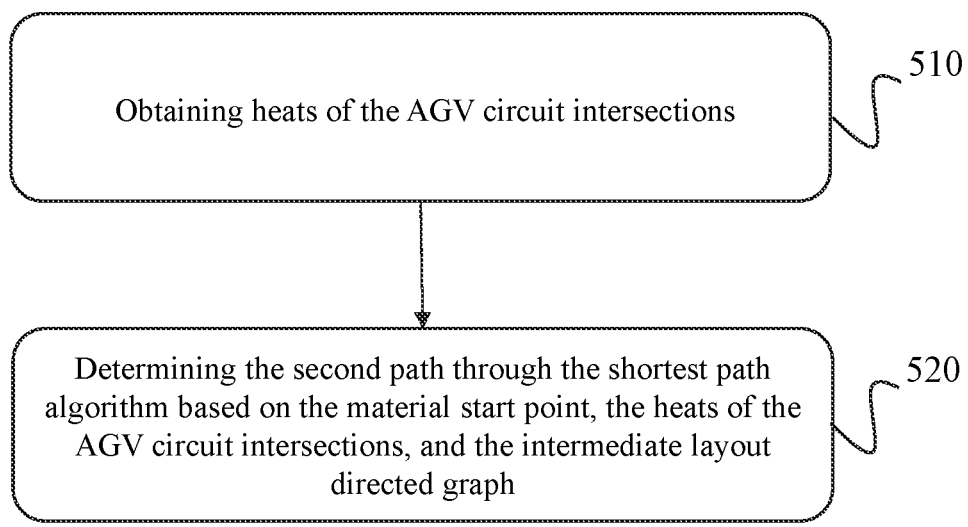
FIG. 5 is a flowchart illustrating an exemplary process for determining a second path according to some embodiments of the present disclosure.

For more content about determining the second path based on the heats of the AGV circuit intersections, please see FIG. 5 and related descriptions thereof.

By calculating the second path in the intermediate layout directed graph, the optimal path for the AGV to transport materials to the first path can be obtained.

The AGV final path may refer to a merged path of the first path and the second path.

In some embodiments, the merge module may merge the first path and the second path into the final AGV path.

At this time, after the first path and the second path are combined, a combined path for one-time full feeding of a single material can be formed, and the AGV vehicle can complete all the feeding of the single material at one time along this path, which effectively saves the travel frequency of the AGV vehicle.

In some embodiments, the communication module may send the final path of the AGV to the user platform through the service platform to display to the user.

In the embodiment of the present disclosure, through the two-stage planning of the travel path of the AGV vehicle, the travel frequency of the AGV vehicle is effectively reduced, the transportation pressure on the AGV path is reduced, and it is also very beneficial to the travel planning of the AGV vehicle and the material planning of the production circuit in the later stage, reducing the control and calculation pressure of the unmanned intelligent factory area.

In a possible implementation manner, the second calculation module is further configured to perform the following steps.

A third path in the intermediate layout directed graph may be calculated, wherein the third path is the shortest path from the material start point to the corresponding sub-node.

The times of intersections of each AGV circuit intersection of the intermediate layout directed graph under the third path may be obtained.

The weight of the edge of the each AGV circuit intersection in the intermediate layout directed graph may be adjusted according to the times of intersections, and the third path may be calculated again.

The weight may be adjusted repeatedly and the third path may be calculated until the times of intersections satisfy a preset requirement, and the lastly calculated third path may be used as the second path.

In a possible implementation manner, the second calculation module is further configured to perform the following steps.

The average value of all intersection times may be calculated as a reference value, and the ratio of the intersection times to the reference value may be calculated.

A value of the ratio less than one may be replaced with one to form a correction value.

The correction value may be multiplied by the corresponding edge weight of the each AGV circuit intersection to complete the weight adjustment.

When the embodiments of the present disclosure are implemented, in order to reduce the congestion at the intersection of AGV circuit, it is necessary to further plan the travel circuits of all AGVs; since the weight of the edge is the length of the edge, when the intersection times of an intersection exceed the threshold, the weight of the edge corresponding to the intersection may be increased to reduce the intersection times passing through the intersection, therefore, in the embodiment of the present disclosure, the optimal solution is sought through iteration. After each calculation of the third path, the average value of the intersection times is used as the reference value to correct the weight of the edge. In order to reduce the iterative drift and speed up the calculation iteration convergence, it is necessary to replace the value less than one in the ratio with one to form a correction value, and multiply the weight of the edge by the correction value as the correction coefficient to form the weight of the edge in the current iteration, and recalculate the third path. In this way, the trajectory of the AGV vehicle can be evenly distributed in the directed graph to the greatest extent, and the risk of congestion at the intersection can be reduced. Even if this may increase the operation path of some AGV vehicles, when an AGV operation planning is performed, the AGV path to reduce congestion is to greatly reduce the calculation cost.

It should be understood that each intersection should correspond to one of the ratios, and after replacing the ratios less than 1 with 1, the ratios greater than or equal to 1 may be directly used as the correction values without correction. For example, there are five intersections, the corresponding intersection times are 6, 5, 4, 3, and 2, respectively, and the average value is 4. The calculated ratios are 1.5, 1.25, 1, 0.75, and 0.5, then the corresponding correction values are 1.5, 1.25, 1, 1, 1, and these correction values are multiplied by the corresponding weights to complete the weight adjustment.

In a possible implementation manner, the reconstruction module may be further configured to perform the following steps.

In the first layout directed graph, the material end point may be replaced with the corresponding sub-nodes, and each sub-node inherits the corresponding assignment of the material end point.

The edge corresponding to the material end point may be assigned to all corresponding sub-nodes to complete the reconstruction.

In a possible implementation manner, the reconstruction module may be further configured to perform the following steps.

The sub-nodes corresponding to the same material may be extracted as candidate sub-nodes.

In the second layout directed graph, only the candidate sub-nodes and the AGV circuit intersection are reserved as nodes to form the third layout directed graph.

When the embodiments of the present disclosure are implemented, a solution for performing directed graph reconstruction and generating a third layout directed graph is provided. For the reconstruction, assigning the edge corresponding to the material end point to the sub-node means connecting each sub-node to a set of corresponding edges. When the third layout directed graph is generated, non-candidate sub-nodes and the intersection of non-AGV circuits are eliminated to reduce the amount of node calculation.

In a possible implementation manner, the sensor network platform includes a general sensor network platform and at least two sensor network sub-platforms.

The general sensor network platform uniformly receives the data of the target workshop, and transmits different categories of data to the management platform through different sensor network sub-platforms.

The management platform uniformly processes received data and then uniformly sends it to the service platform.

The service platform includes a general service platform and at least two service sub-platforms, the general service platform receives the data sent by the management platform and sends the different categories of data to the user platform through the service sub-platforms to the user platform to display to the user.

In some embodiments, the first calculation module may also determine a minimum spanning tree based on the third layout directed graph. Based on the minimum spanning tree, at least one irrelevant node of the minimum spanning tree and at least one edge corresponding to the at least one irrelevant node may be determined. The minimum graph may be determined by deleting the at least one irrelevant node and the at least one edge.

In some embodiments, the first calculation module may also select a node or sub-node in the minimum graph as a start point. Based on the start point, the first path based on a first path weight may be determined, wherein the first path weight is related to a length of the path and a material requirement of the sub-node corresponding to an end point of the path.

In some embodiments, the second calculation module may also obtain the heats of the AGV circuit intersections. Based on the material start point, the heats of the AGV circuit intersections and the directed graph of the intermediate layout, the second path may be determined through the shortest path algorithm.

Figure 2:
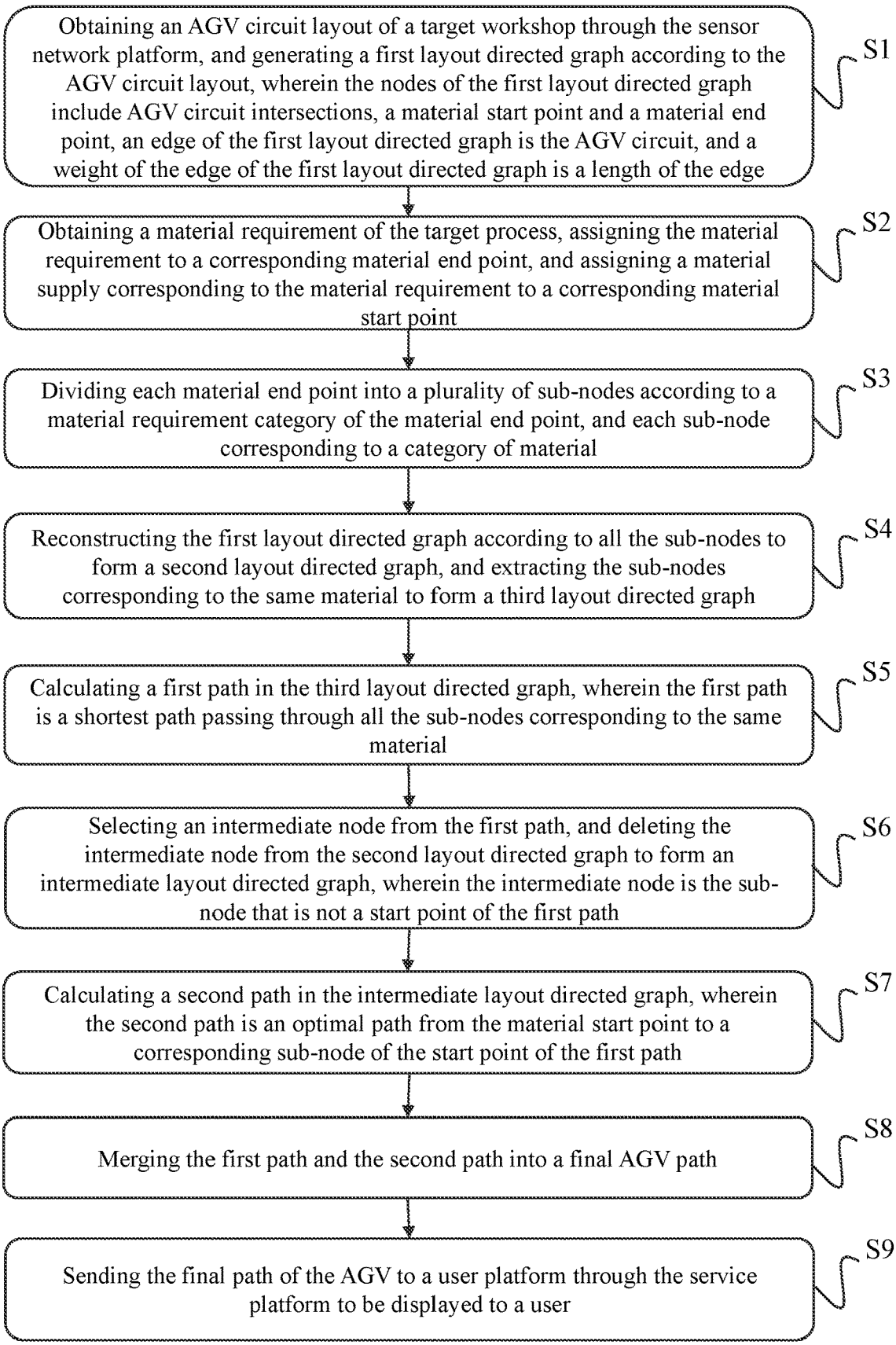
FIG. 2 is a flowchart of method steps according to some embodiments of the present disclosure.

On the basis of the above, please refer to FIG. 2, which is a schematic flowchart of The Industrial Internet of Things for material transportation control provided by the embodiment of the present disclosure. The Industrial Internet of Things for material transportation control may be applied to the Industrial Internet of Things for material transportation control in FIG. 1.

Further, The Industrial Internet of Things for material transportation control may specifically include the content described in the following steps S1-S9. In some embodiments, steps S1-S9 may be performed by the management platform.

S1: Obtaining an AGV circuit layout of a target workshop through the sensor network platform, and generating a first layout directed graph according to the AGV circuit layout, wherein the nodes of the first layout directed graph include AGV circuit intersections, a material start point and a material end point, an edge of the first layout directed graph is the AGV circuit, and a weight of the edge of the first layout directed graph is a length of the edge.

S2: Obtaining a material requirement of the target process, assigning the material requirement to a corresponding material end point, and assigning a material supply corresponding to the material requirement to a corresponding material start point.

S3: Dividing each material end point into a plurality of sub-nodes according to a material requirement category of the material end point, and each sub-node corresponding to a category of material.

S4: Reconstructing the first layout directed graph according to all the sub-nodes to form a second layout directed graph, and extracting the sub-nodes corresponding to the same material to form a third layout directed graph.

S5: Calculating a first path in the third layout directed graph, wherein the first path is a shortest path passing through all the sub-nodes corresponding to the same material.

S6: Selecting an intermediate node from the first path, and deleting the intermediate node from the second layout directed graph to form an intermediate layout directed graph, wherein the intermediate node is the sub-node that is not a start point of the first path.

S7: Calculating a second path in the intermediate layout directed graph, wherein the second path is an optimal path from the material start point to a corresponding sub-node of the start point of the first path.

S8: Merging the first path and the second path into a final AGV path.

S9: Sending the final path of the AGV to a user platform through the service platform to be displayed to a user.

In a possible implementation manner, calculating the second path in the intermediate layout directed graph includes the following contents.

A third path in the intermediate layout directed graph may be calculated, wherein the third path is a shortest path from the material start point to the corresponding sub-node.

The times of intersections of each AGV circuit intersection of the intermediate layout directed graph under the third path may be obtained.

A weight of a corresponding edge of the corresponding AGV circuit intersection in the intermediate layout directed graph may be adjusted according to the intersection times, and calculate the third path again.

The edge weight of the edge may be adjusted repeatedly and the third path may be calculated until the intersection times satisfy a preset requirement, and use a lastly calculated third path as the second path.

In a possible implementation manner, adjusting the corresponding edge weights of the corresponding AGV circuit intersections in the intermediate layout directed graph according to the times of intersections includes the following steps.

The average value of all intersection times may be calculated as a reference value, and the ratio of the intersection times to the reference value may be calculated.

A value of the ratio less than one may be replaced with one to form a correction value.

The correction value may be multiplied by the weight of the corresponding edge of the corresponding AGV circuit intersection to complete a weight adjustment.

In a possible implementation manner, reconstructing the first layout directed graph according to all sub-nodes to form the second layout directed graph includes the following steps.

The material end point may be replaced with the corresponding sub-nodes in the first layout directed graph, wherein each sub-node inherits a corresponding assignment of the material end point.

Edges corresponding to the material end points may be assigned to all corresponding sub-nodes to complete the reconstruction.

In a possible implementation manner, extracting sub-nodes corresponding to the same material to form a third layout directed graph includes the following steps.

The sub-nodes corresponding to the same material extracted as candidate sub-nodes.

In the second layout directed graph, only the candidate sub-nodes and the AGV circuit intersection are reserved as nodes to form the third layout directed graph.

FIG. 3 is a flowchart illustrating an exemplary process for determining a first path according to some embodiments of the present disclosure. In some embodiments, process 300 may be performed by a processor.

Step 310: Processing the third layout directed graph to determine a minimum graph.

The minimum graph refers to a sub-graph generate after deleting unnecessary nodes from the third layout directed graph. The unnecessary nodes refer to nodes that do not need to be passed when the AGV feeding vehicle passes through all sub-nodes corresponding to the same material. For example, unnecessary nodes are AGV circuit intersections, material start point, sub-nodes corresponding to other materials, etc., which are far away from all the sub-nodes corresponding to the same material. The AGV feeding vehicle is equivalent to the AGV vehicle described above.

In some embodiments, the minimum graph is a sub-graph of the third layout directed graph, including at least all sub-nodes corresponding to the same material. For example, a minimal graph may include all sub-nodes of the material end point that requires steel.

In some embodiments, the processor may determine the minimum graph through a variety of preset rules, preset models, or the like. For example, the processor may directly delete the material start point, the AGV circuit intersection with a distance greater than a certain threshold (for example, 50 meters, etc.) from all the sub-nodes corresponding to the same material, and the sub-nodes corresponding to other materials, and so on. As another example, the preset model may be a machine learning model, for example, a graph neural network model, a convolutional neural network model, etc. The input of the preset model may be a third layout directed graph, and the output is a minimum graph. The training samples are the third layout directed graphs corresponding to a large number of historical feeding tasks, and the labels are the minimum graphs generated by manually deleting the unnecessary nodes.

In some embodiments, the processor may further determine, based on the third layout directed graph, at least one irrelevant node and at least one edge corresponding to the at least one irrelevant node, delete the at least one irrelevant node and at least one edge, and determine the minimum graph. For detailed descriptions, please refer to FIG. 4 and related parts thereof.

Step 320: Based on the minimum graph, determining a count of singularities of nodes and sub-nodes in the minimum graph, wherein the singularities are nodes or sub-nodes with an odd count of edges.

Figure 4:
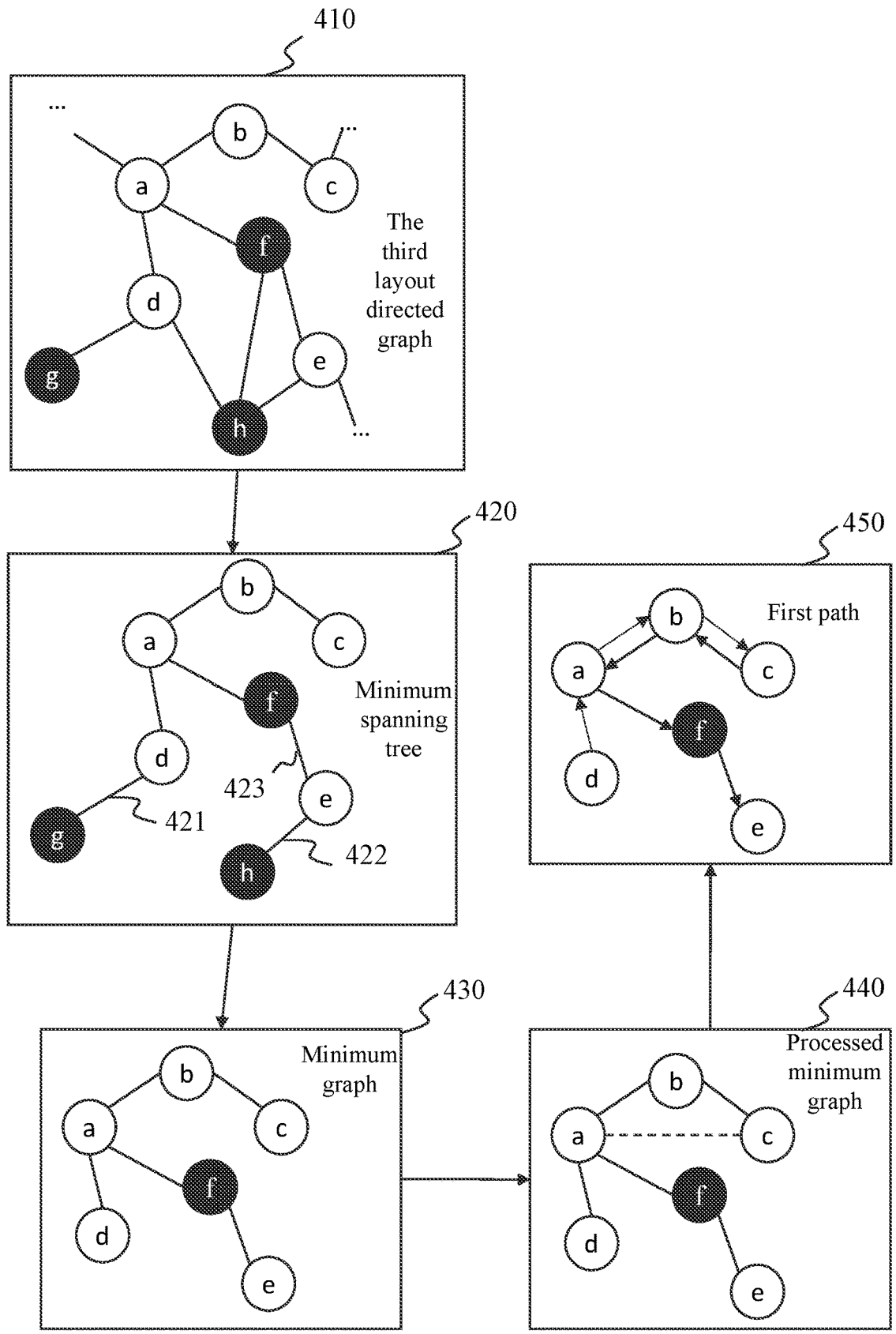
FIG. 4 is a schematic diagram illustrating an exemplary process for determining a minimum graph according to some embodiments of the present disclosure.

Singularity refers to a node or sub-node with an odd count of edges (AGV circuits) passing through the node. For example, if the count of edges of the AGV circuit passing through this node is 3, the node is a singularity. As shown in FIG. 4, in the minimum graph 430, singularities may be node d, node a, node c, and node e. The count of singularities may be the count of all singularities in the minimum graph.

In some embodiments, the processor may determine the count of singularities through mathematical statistics, or the like. For example, the processor may count all nodes with an odd count of traversed edges, and use the counted count of nodes as the count of singularities.

Step 330: Based on the count of singularities, determining whether an AGV feeding vehicle passes through a same road section at least once in a journey through all the sub-nodes corresponding to the same material.

The same road section refers to a repeated road section that the AGV feeding vehicle passes through in the journey through all the sub-nodes corresponding to the same material. For example, if the AGV feeding vehicle passes through the section from node 1 to node 2 twice during the journey through all sub-nodes corresponding to the same material, the AGV circuit between node 1 and node 2 is the same road section.

In some embodiments, the processor may determine, based on the count of singularities, whether the AGV feeding vehicle passes through the same road section at least once during the journey through all sub-nodes corresponding to the same material. For example, when the count of singularities is N=0 or N=2, after the AGV feeding vehicle passes through a node or a sub-node in the journey through all the sub-nodes corresponding to the same material, it may leave the node or sub-node by passing through another different AGV circuit and may not pass through the same road section. When the count of singularities N>2, there is at least one node or sub-node, and the AGV feeding vehicle may not leave from the node or sub-node by passing through another different AGV circuit after passing through the at least one node or sub-node in the journey through all sub-nodes corresponding to the same material and may pass through the same road section.

Step 340: In response to the AGV feeding vehicle not passing through the same road section at least once, determining the first path based on a manner of not passing through the same road section.

The manner of not passing through the same road section refers to a manner in which the AGV feeding vehicle does not pass through the repeated road section for feeding when it passes through all the sub-nodes corresponding to the same material. Not passing through the same road section means that the AGV feeding vehicle only passes each AGV circuit once when passing through all the sub-nodes corresponding to the same material.

In some embodiments, the processor may determine the manner of not passing the same road section based on various preset rules. For example, the processor may control the AGV feeding vehicle to select an un-passed road section when visiting the next node.

In some embodiments, the manner of not passing the same road section may further include: selecting a node or sub-node in the minimum graph as a start point; and based on the start point, determining the first path by a first path weight, wherein the first path weight is related to the length of the path and the material requirement of the sub-node corresponding to the end point of the path.

The start point may refer to a start point of the first path. The start point may be a node or a sub-node in the minimum graph. The first path weight refers to the weight of the path connecting any two nodes or sub-nodes in the minimum graph. For example, the first path weight corresponding to the path connecting node 2 and node 3 may be 5, or the like.

The length of the path refers to the length of the path connecting any two nodes or sub-nodes. For example, the length of the path connecting node 2 and node 3 is 100 meters, etc.

The material requirement of the sub-node corresponding to the end point of the path refers to the material requirement of the sub-node corresponding to the end point pointed to by the path. For example, for a path from node 2 to node 3, the material requirement of the sub-node corresponding to the end point is the material requirement of node 3 (for example, 100 kg of steel is required, etc.).

In some embodiments, the first path weight may be weighted and determined by the length of the path and the material requirement of the sub-node corresponding to the end point of the path. For example, the first path weight may be determined based on the following formula:

$$\text{first path weight} = r \times \left( a \times L + b \times \frac{1}{M} \right)$$

wherein, r represents a conversion factor, which may be preset artificially; L represents the length of the path, and M represents the material requirement of the sub-node corresponding to the end point of the path; a and b respectively represent the length of the path and the preset weight corresponding to the material requirement of the sub-node corresponding to the end point of the path.

In some embodiments, the first path weight is proportional to the length of the path, and is inversely proportional to the material requirement of the sub-node corresponding to the end point of the path. For example, the longer the path length of path A, the larger the corresponding first path weight, the smaller the material requirement of the sub-node corresponding to the end point of the path, and the larger the first path weight corresponding to the path.

In some embodiments, when the count of singularities N=0, the processor may select any node or sub-node in the minimum graph as the start point of the first path, and the start point and end point of the first path are the same node or sub-node.

In some embodiments, when the count of singularities N=2, the processor may select one singularity in the minimum graph as the start point of the first path, and another singularity as the end point of the first path.

In some embodiments, when the count of singularities N=2, the processor may start from the start point of the first path, and when there are a plurality of AGV circuits from one node to another node, the processor selects the AGV circuit corresponding to a smaller first path weight as the AGV circuit in the first path, and then the AGV circuit selection between the next nodes is continued until the end point of the first path is reached. The processor determines all the AGV circuits determined above as the first path.

In some embodiments, when the count of singularities N=0, the processor may select any node or sub-node in the minimum graph as the start point of the first path (the start point and the end point of the first path are the same points at this time), there may be the plurality of first paths determined by selecting different nodes or sub-nodes as the start point of the path, and the processor may select the path with the smallest sum of the first path weights between adjacent two nodes corresponding to each AGV circuit among a plurality of first paths as the first path.

The processor determines the first path based on the first path weight, selects the shortest path to complete the feeding task between all sub-nodes corresponding to the same material, which improves the feeding efficiency, and also allows the AGV feeding vehicle to preferentially go to the sub-nodes with a large material requirement, to achieve the purpose of quickly unloading and reducing the energy consumption of subsequent movements.

Step 350: In response to the AGV feeding vehicle passing through the same road section at least once, after pairing each two of the singularities based on a pairing condition, determining the first path based on a manner of passing through the same road section.

In some embodiments, the processor may process the minimum graph based on the pairing condition, and determine the first path based on the processed minimum graph.

As shown in FIG. 4, the processor may perform pairing processing on node a and node c based on the minimum graph 430 to obtain a processed minimum graph 440, and determine the first path 450 based on the processed minimum graph 440.

The pairing condition refers to the condition that each two of the plurality of singularities in the minimum graph are paired with the original AGV circuit to reduce the count of singularities. For example, a condition for pairing a and c of singularities a, d, c, and e in the minimum graph 430.

In some embodiments, the pairing condition may include a sum of path connections between each two singularities is smallest.

The minimum sum of path connections between each two singularities may refer to the minimum sum of the first path weights of at least one AGV circuit between each two singularities. For more description about the first path weight, please refer to the related description of step 340.

As shown in FIG. 4, in the minimum graph 430, four singularities d, a, c, e are included. The processor may pair each two of the four nodes in a plurality of ways (e.g., random pairing). After pairing, the sum of the first path weights of at least one AGV circuit between each two paired singularities is calculated. The two nodes with the smallest sum of the first path weights are determined as paired singularities. For example, the node a and the node c corresponding to the AGV circuit with the smallest sum of the first path weights are paired to obtain the processed minimum graph 440.

The manner of passing through the same road section refers to the way that the AGV feeding vehicle passes through the repeated road sections for feeding when passing through all the sub-nodes corresponding to the same material. The passing through repeated road sections means that the AGV feeding vehicle may pass each AGV circuit at least two times when passing through all the sub-nodes corresponding to the same material.

In some embodiments, there are two remaining singularities after pairing according to the pairing condition, and the processor selects one of the remaining two singularities after pairing as the start point of the first path, and the end point of the first path is another remaining one. Starting from the start point of the first path, when there are the plurality of AGV circuits from one node to another node, the processor selects the corresponding AGV circuit with the smaller weight of the first path as the AGV circuit in the first path, and then continues to select the AGV circuit with the smaller first path weight between the next node a as the AGV circuit in the first path until the end point of the first path is reached. Before reaching the end point of the first path, the feeding vehicle repeatedly passes through at least one AGV circuit between each two singularities paired by the pairing condition. The processor determines all the AGV circuits determined above as the first path.

In some embodiments, there is no singularity after pairing through the pairing condition, the processor may select any node or sub-node as the start point of the first path (in this case, the end point and start point of the first path are the same points), there may be the plurality of first paths determined by selecting different nodes or sub-nodes as the start point of the path, and the processor may select the path with the smallest sum of the first path weights of each AGV circuit among a plurality of first paths as the first path.

For example, as shown in the processed minimum graph 440, the processor may select node d as the start point of the first path, and reach node a through the AGV circuit; the sum of the first path weights corresponding to the AGV circuits after node a and node c are paired is smaller than the sum of the first weights corresponding to other AGV circuits, so the AGV feeding vehicle passes through node b and node c in turn after leaving node a; after passing through node c, the AGV feeding vehicle returns to node b and node a in turn through repeated AGV circuits; and finally, it passes through node f and node e in turn. The processor determines the AGV circuit corresponding to the successive access nodes of the AGV feeding vehicle as the first path 450.

In some embodiments, when the AGV feeding vehicle performs the feeding task, it may also replenish materials at some nodes, conduct inspections on the AGV circuit, and so on.

The processor determines the first path based on the count of singularities in the minimum graph. The shortest path may be chosen as much as possible and preferentially select the AGV feeding circuit with a large material requirement, which improves transportation efficiency and saves transportation resources.

FIG. 4 is a schematic diagram illustrating an exemplary process for determining a minimum graph according to some embodiments of the present disclosure.

In some embodiments, the processor may determine a minimum spanning tree based on the third layout directed graph; based on the minimum spanning tree, determine at least one irrelevant node of the minimum spanning tree and at least one edge corresponding to the at least one irrelevant node; and determine the minimum graph by deleting the at least one irrelevant node and the at least one edge.

The minimum spanning tree may refer to a connected graph including all the sub-nodes corresponding to the material. For example, the minimum spanning tree may refer to a connected graph including all the sub-nodes corresponding to the material obtained based on the third layout directed graph.

In some embodiments, the processor may determine a minimum spanning tree based on the third layout directed graph. For example, the processor may determine a candidate spanning tree by a spanning tree determination algorithm based on the third layout directed graph, and determine a minimum spanning tree based on the candidate spanning tree. The spanning tree determination algorithm may include Prim's algorithm, or the like.

As shown in FIG. 4, the processor may determine a minimum spanning tree 420 through Prim's algorithm based on the third layout directed graph 410. The processor may classify all nodes in the third layout directed graph 410 into two categories. One category is the nodes (assuming category A nodes) that have been placed into the candidate spanning tree in the process of determining the minimum spanning tree 420. The other category is nodes (assuming category B nodes) that have not been placed in the candidate spanning tree during the process of determining the minimum spanning tree 420. Before the algorithm begins, the processor may classify all nodes in the third layout directed graph 410 as category B nodes. The processor may construct an adjacency matrix, and in the adjacency matrix, the preset weights of the connected edges are used as the values of the corresponding nodes, and the values of the corresponding nodes of the disconnected edges are set to infinity. The preset weight may refer to a weight that is preset according to needs. For example, the preset weight value may be related to the attribute of the edge. The longer the length of the edge is, the larger the preset weight value is, and the larger the value of the corresponding node is. In some embodiments, the preset weights may be automatically set by the system or be manually set according to requirements. The processor may select any node in the third layout directed graph 410 as the starting node, and move the node from the category B nodes to the category A nodes. Then, the processor may obtain a node in the category B nodes with the smallest value between the node and a corresponding node in the category A nodes based on the adjacency matrix, move the node from the category B nodes to the category A nodes, and connect the node with the corresponding node based on an edge. Repeat until there are no nodes in the category B nodes. At this time, the edge formed between the category A node and the category A node is the candidate spanning tree of the third layout directed graph 410. The processor may set different preset weights and repeat the above steps, and select the optimal candidate spanning tree among all the obtained candidate spanning trees as the minimum spanning tree 420. In some embodiments, the optimal candidate spanning tree may be automatically selected empirically by the system or manually selected.

The irrelevant node may refer to a sub-node that does not need to be passed through all the sub-nodes corresponding to the same material in the third layout directed graph. For example, the third layout directed graph passes through the intersection of AGV circuits that all the sub-nodes corresponding to the same material do not need to pass.

The at least one edge may refer to at least one edge corresponding to at least one irrelevant node, for example, an edge connecting between at least one irrelevant node and the AGV circuit intersection in the third layout directed graph.

In some embodiments, the processor may determine at least one irrelevant node of the minimum spanning tree and at least one edge corresponding to the at least one irrelevant node based on the minimum spanning tree. For example, the processor may determine at least one irrelevant node of the minimum spanning tree and at least one edge corresponding to the at least one irrelevant node according to a preset rule based on the minimum spanning tree.

In some embodiments, the preset rule may include that if a certain AGV circuit intersection and its associated edge in the minimum spanning tree are deleted, at least one sub-graph is formed by the remaining nodes and edges, one of the subgraphs includes all material end sub-nodes, it is judged that the AGV circuit intersection and its associated edge are at least one irrelevant node of the minimum spanning tree and at least one edge corresponding to the at least one irrelevant node. For example, as shown in FIG. 4, the black dots and white dots in the figure represent different categories of nodes respectively, the black dots are the intersections of the AGV circuits, and the white dots are the sub-nodes of the material end point. The processor may determine, based on a preset rule, that after the node g and the edge 421 associated with the node g in the minimum spanning tree 420 are deleted, the sub-graph formed by the remaining nodes and edges includes all material end-point sub-nodes. The processor may determine that the node g and the edge 421 associated with the node g are at least one irrelevant node of the minimum spanning tree 420 and at least one edge corresponding to the at least one irrelevant node. For another example, as shown in FIG. 4, the processor may, based on a preset rule, determine that after the node f and the edge 423 associated with the node f in the minimum spanning tree 420 are deleted, the subgraph formed by the remaining nodes and edges does not include all material end point sub-nodes. The processor may determine that node f and edge 423 associated with node f are not at least one irrelevant node of the minimum spanning tree 420 and at least one edge corresponding to the at least one irrelevant node.

In some embodiments, the processor may determine the minimum graph based on the minimum spanning tree. For example, the processor may directly determine the determined minimum spanning tree as a minimum graph.

In some embodiments, the processor may delete at least one irrelevant node and at least one edge to determine a minimum graph. For example, the processor may delete at least one irrelevant node and the at least one edge determined based on a preset rule in the determined minimum spanning tree, and use the sub-graph formed by the remaining nodes and edges as the minimum graph. Exemplarily, as shown in FIG. 4, the processor may delete at least one irrelevant node and the at least one edge determined based on a preset rule in the minimum spanning tree 420. That is, nodes g and h, edge 421 associated with node g, and edge 422 associated with node h may be deleted. The sub-graph formed by the remaining nodes and edges is taken as the minimum graph 430.

Determine the minimum spanning tree based on the third layout directed graph, and then delete at least one irrelevant node of the minimum spanning tree and at least one edge corresponding to the at least one irrelevant node to determine the minimum graph, which can effectively delete redundant nodes and unnecessary paths in the third layout directed graph, help to choose a transportation path of the AGV that makes the material transportation more accurate and efficient, and save the AGV transportation resources.

FIG. 5 is a flowchart illustrating an exemplary process for determining a second path according to some embodiments of the present disclosure. In some embodiments, process 500 may be performed by a processor.

Step 510: Obtaining heats of the AGV circuit intersections.

The heats of AGV circuit intersections refers to frequency of the AGV circuit intersections visited by AGV feeding vehicle within a preset time. For example, the heats of the AGV circuit intersection may be 5 vehicles/hour. The preset time refers to the time corresponding to the AGV feeding vehicle in the historical data. The visit frequency refers to the count of AGV feeding vehicles visiting the AGV circuit intersection within the preset time.

In some embodiments, the heats of the AGV circuit intersections may be determined based on the historical data. For example, the processor may determine the frequency of the AGV feeding vehicle visiting the AGV circuit intersection within a historical time (e.g., 1 day, etc.) as the heats of the AGV circuit intersections.

Step 520: Determining the second path through the shortest path algorithm based on the material start point, the heats of the AGV circuit intersections, and the intermediate layout directed graph.

The shortest path algorithm may be used to find the shortest path from one node to the rest of the nodes in the graph. The shortest path algorithm may include a Bellman-Ford algorithm, a Dijkstra algorithm, or the like.

In some embodiments, the processor may determine the material start point as the start point of the second path. The start point of the first path is determined as the end point of the second path. The processor may divide all sub-nodes in the intermediate layout directed graph into two sets of marked nodes and unmarked nodes. The processor may start from the start point of the second path, continuously search for the node with the shortest path length among the unmarked nodes, and mark it until all nodes are marked. In some embodiments, finding the node with the shortest path length may also include the heats of the AGV circuit intersections at the end point of the path. For example, the processor may perform a weighted fusion of the heats of the AGV circuit intersections reaching the path length and the end point of the path. The weighted weight may be determined by artificial presetting or the like. The processor may determine the path with the smallest value of all fusion weights as the second path.

Based on the material start point, the heats of the AGV circuit intersections and the intermediate layout directed graph, the processor can select the shortest feeding path and improve the feeding efficiency, while reducing the probability of a plurality of AGV feeding vehicles accessing the same AGV circuit intersection at the same time, reducing the possibility of congestion.

Those skilled in the art can realize that the units and algorithm steps of each example described in connection with the embodiments disclosed herein can be implemented by electronic hardware, computer software or the combination of both. In order to clearly illustrate the interchangeability of hardware and software, the components and steps of each example have been generally described in terms of functions in the above description. Whether these functions are performed in hardware or software depends on the specific application and design constraints of the technical solution. Skilled artisans may implement the described functionality using different methods for each particular application, but such implementations should not be considered beyond the scope of this description.

In the several embodiments provided in the present disclosure, it should be understood that the disclosed apparatus and method may be implemented in other manners. For example, the apparatus embodiments described above are only illustrative. For example, the division of the units is only a logical function division. In actual implementation, there may be other division methods. For example, multiple units or components may be combined or can be integrated into another system, or some features can be ignored, or not implemented. In addition, the shown or discussed mutual coupling or direct coupling or communication connection may be indirect coupling or communication connection through some interfaces, devices or units, and may also be electrical, mechanical or other forms of connection.

The unit described as a separate component may or may not be physically separated. As a unit, it is obvious that those of ordinary skill in the art can realize that the unit and algorithm steps of each example described in conjunction with the embodiments disclosed herein can be used. It is implemented by electronic hardware, computer software or a combination of the two. In order to clearly illustrate the interchangeability of hardware and software, the above description has generally described the components and steps of each example in terms of functions. Whether these functions are performed in hardware or software depends on the specific application and design constraints of the technical solution. Skilled artisans may implement the described functionality using different methods for each particular application, but such implementations should not be considered beyond the scope of this description.

In addition, each functional unit in each embodiment of the present disclosure may be integrated into one processing unit, or each unit may exist physically alone, or two or more units may be integrated into one unit. The above-mentioned integrated units may be implemented in the form of hardware, or may be implemented in the form of software functional units.

The integrated unit, if implemented in the form of a software functional unit and sold or used as an independent product, may be stored in a computer-readable storage medium. Based on this understanding, the technical solutions of the present disclosure are essentially or parts that contribute to the prior art, or all or part of the technical solutions can be embodied in the form of software products, and the computer software products are stored in a storage medium In the present disclosure, several instructions are included to cause a computer device (which may be a personal computer, a server, or a grid device, etc.) to execute all or part of the steps of the methods described in the various embodiments of the present disclosure. The aforementioned storage medium includes: U disk, removable hard disk, Read-Only Memory (ROM, Read-Only Memory), Random Access Memory (RAM, Random Access Memory), magnetic disk or optical disk and other media that can store program codes.

The specific embodiments described above further describe the purpose, technical solutions and beneficial effects of the present disclosure in detail. It should be understood that the above descriptions are only specific implementations of the present disclosure, and are not intended to limit the scope of the present disclosure. The protection scope, any modification, equivalent replacement, and improvement made within the spirit and principle of the present disclosure shall be included within the protection scope of the present disclosure.

What is claimed is:

1. An Industrial Internet of Things system for material transportation control, comprising a sensor network platform, a management platform and a service platform connected in sequence, wherein the management platform includes:
   an obtaining module, configured to obtain an Automated Guided Vehicle (AGV) circuit layout of a target workshop through the sensor network platform, and generate a first layout directed graph according to the AGV circuit layout, wherein nodes of the first layout directed graph include AGV circuit intersections, a material start point, and a material end point, an edge of the first layout directed graph is an AGV circuit, and a weight of the edge of the first layout directed graph is a length of the edge;
   a material module, configured to obtain a material requirement of a target process, assign the material requirement to a corresponding material end point, and assign a material supply corresponding to the material requirement to a corresponding material start point;
   a decomposition module, configured to divide each material end point into a plurality of sub-nodes according to a material requirement category of the material end point, and each sub-node corresponding to a category of material;
   a reconstruction module, configured to reconstruct the first layout directed graph according to all the sub-nodes to form a second layout directed graph, and extract sub-nodes corresponding to a same material to form a third layout directed graph;
   a first calculation module, configured to calculate a first path in the third layout directed graph, wherein the first path is a shortest path passing through all the sub-nodes corresponding to the same material;
   a correction module, configured to select an intermediate node from the first path, and delete the intermediate node from the second layout directed graph to form an intermediate layout directed graph, wherein the intermediate node is the sub-node that is not a start point of the first path;

a second calculation module, configured to calculate a second path in the intermediate layout directed graph, wherein the second path is an optimal path from the material start point to a corresponding sub-node of the start point of the first path;

a merging module, configured to merge the first path and the second path into a final AGV path; and a communication module, configured to send the final AGV path to a user platform through the service platform to display to a user.

2. The Industrial Internet of Things system for material transportation control of claim 1, wherein the second calculation module is further configured to:

calculate a third path in the intermediate layout directed graph, wherein the third path is a shortest path from the material start point to the corresponding sub-node of the start point of the first path;

obtain intersection times of each AGV circuit intersection of the intermediate layout directed graph under the third path;

adjust a weight of an edge of the each AGV circuit intersection of the intermediate layout directed graph according to the intersection times, and calculate the third path again; and repeatedly adjust the weight of the edge and calculate the third path until the intersection times satisfy a preset requirement, and use a lastly calculated third path as the second path.

3. The Industrial Internet of Things system for material transportation control of claim 2, wherein the second calculation module is further configured to:

calculate an average value of all the intersection times as a reference value, and calculate a ratio of the intersection times to the reference value;

replace a value of the ratio less than one with one to form a correction value; and multiple the correction value by the weight of the edge of the each AGV circuit intersection to complete a weight adjustment.

4. The Industrial Internet of Things system for material transportation control of claim 1, wherein the reconstruction module is further configured to:

replace the material end point with corresponding sub-nodes in the first layout directed graph, wherein each sub-node inherits an assigned value of the material end point; and assign edges corresponding to the material end point to all the corresponding sub-nodes to complete a reconstruction.

5. The Industrial Internet of Things system for material transportation control of claim 1, wherein the reconstruction module is further configured to:

extract the sub-nodes corresponding to the same material as candidate sub-nodes; and only reserve the candidate sub-nodes and the AGV circuit intersections as nodes in the second layout directed graph to form the third layout directed graph.

6. The Industrial Internet of Things system for material transportation control of claim 1, wherein the sensor network platform comprises a general sensor network platform and at least two sensor network sub-platforms;

the general sensor network platform uniformly receives the data of the target workshop, and transmits different categories of data to the management platform through different sensor network sub-platforms;

the management platform uniformly processes received data and then uniformly sends it to the service platform; and the service platform includes a general service platform and at least two service sub-platforms, the general service platform receives the data sent by the management platform and sends the different categories of data to the user platform through the service sub-platforms to the user platform to display to the user.

7. A control method for an Industrial Internet of Things system for material transportation control, comprising a sensor network platform, a management platform and a service platform connected in sequence, wherein the control method is executed by the management platform; and the control method includes:

obtaining an Automated Guided Vehicle (AGV) circuit layout of a target workshop through the sensor network platform, and generating a first layout directed graph according to the AGV circuit layout, wherein nodes of the first layout directed graph include AGV circuit intersections, a material start point, and a material end point, an edge of the first layout directed graph is an AGV circuit, and a weight of the edge of the first layout directed graph is a length of the edge;

obtaining a material requirement of a target process, assigning the material requirement to a corresponding material end point, and assigning a material supply corresponding to the material requirement to a corresponding material start point;

dividing each material end point into a plurality of sub-nodes according to a material requirement category of the material end point, and each sub-node corresponding to a category of material;

reconstructing the first layout directed graph according to all the sub-nodes to form a second layout directed graph, and extracting the sub-nodes corresponding to a same material to form a third layout directed graph;

calculating a first path in the third layout directed graph, wherein the first path is a shortest path passing through all the sub-nodes corresponding to the same material;

selecting an intermediate node from the first path, and deleting the intermediate node from the second layout directed graph to form an intermediate layout directed graph, wherein the intermediate node is the sub-node that is not a start point of the first path;

calculating a second path in the intermediate layout directed graph, wherein the second path is an optimal path from the material start point to a corresponding sub-node of the start point of the first path;

merging the first path and the second path into a final AGV path; and sending the final AGV path to a user platform through the service platform to display to a user.

8. The control method for the Industrial Internet of Things system for material transportation control of claim 7, wherein the calculating the second path in the intermediate layout directed graph comprises:

calculating a third path in the intermediate layout directed graph, wherein the third path is a shortest path from the material start point to the corresponding sub-node;

obtaining intersection times of each AGV circuit intersection of the intermediate layout directed graph under the third path;

adjusting a weight of an edge of the each AGV circuit intersection of the intermediate layout directed graph according to the intersection times, and calculating the third path again; and repeatedly adjusting the weight of the edge and calculating the third path until the intersection times satisfy a preset requirement, and using a lastly calculated third path as the second path.

9. The control method for the Industrial Internet of Things system for material transportation control of claim 8, wherein the adjusting a weight of an edge of the each AGV circuit intersection of the intermediate layout directed graph according to the intersection times includes:

calculating the average value of all intersection times as a reference value, and calculating a ratio of the intersection times to the reference value;

replacing a value of the ratio less than one with one to form a correction value; and multiplying the correction value by the weight of the edge of the each AGV circuit intersection to complete a weight adjustment.

10. The control method for the Industrial Internet of Things system for material transportation control of claim 7, wherein the reconstructing the first layout directed graph according to all the sub-nodes to form a second layout directed graph includes:

replacing the material end point with corresponding sub-nodes in the first layout directed graph, wherein each sub-node inherits a corresponding assignment of the material endpoint; and assigning edges corresponding to the material end point to all the corresponding sub-nodes to complete a reconstruction.

* * * * *